No. 717,003. Patented Dec. 30, 1902.
G. J. HOSKINS.
TOOL FOR SMOOTHING GRAVEL PATHS.
(Application filed Oct. 7, 1902.)

(No Model.)

WITNESSES

INVENTOR
George John Hoskins
By Richards
ATTORNEYS

UNITED STATES PATENT OFFICE.

GEORGE JOHN HOSKINS, OF ULTIMO, NEW SOUTH WALES, AUSTRALIA.

TOOL FOR SMOOTHING GRAVEL PATHS.

SPECIFICATION forming part of Letters Patent No. 717,003, dated December 30, 1902.

Application filed October 7, 1902. Serial No. 126,347. (No model.)

*To all whom it may concern:*

Be it known that I, GEORGE JOHN HOSKINS, a subject of the King of Great Britain and Ireland, and a resident of Wattle street, Ultimo, Sydney, in the State of New South Wales, Commonwealth of Australia, have invented a certain new and useful Tool for Smoothing Gravel Paths, of which the following is a specification.

Garden-paths are generally made of gravel, stone chips, broken shells, ashes, and such like materials, some of which will bind, while some will not, and those that will not bind cause the garden to have an untidy appearance, necessitating much labor to rake the paths in order to maintain upon them a smooth uniform surface.

The present invention has been devised with a view to minimize the labor of maintaining the paths in a tidy condition.

The appliance consists of a long handle, like a rake-handle, a transverse cross-head, which is attached to the handle by a socket in the usual way, and a length of ordinary india-rubber garden-hose (which may be old or new) that is attached to the cross-piece by means of thumb-screws and nuts.

In order that the invention may be properly understood, reference is made to the accompanying sheet of drawings, in which—

Figure 1:
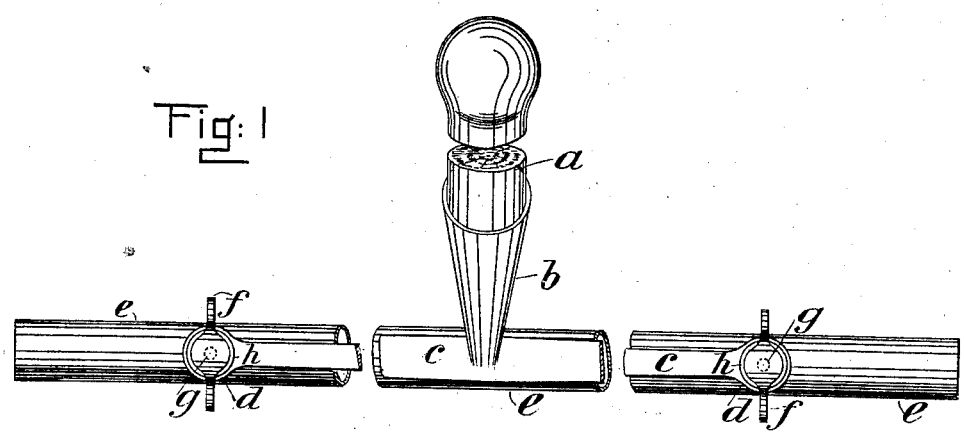
Figure 2:
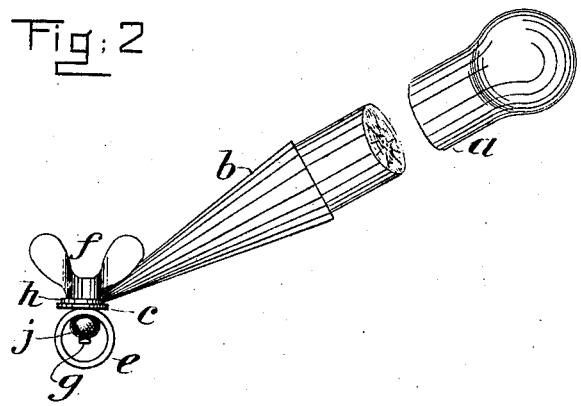

Figure 1 is a plan of the tool. Fig. 2 is an end elevation of the same.

$a$ is the shaft or handle, $b$ the socket into which it fits, which socket projects from a transverse cross-head $c$, formed like the top of a rake, but enlarged at the ends at $d\,d$ to form seats for the binding-screws.

$e$ is a length of india-rubber tubing, such as is used as garden-hose for watering purposes.

$ff$ are thumb-pieces that are made solid with the screws $g\,g$.

$h\,h$ are washers, and $j\,j$ are elliptical nuts that are placed inside the tube $e$ and adapted to engage with the screws $g$.

The tool is used exactly like a rake, being drawn backward and forward over the gravel or other material it is desired to smooth.

The length of the tubing may be from two to three feet; but the ends of the tube should not project too far beyond the screws; otherwise it would be difficult to manipulate the nuts $j$ when it is desired to renew the length of tubing $e$.

Having now described my invention, what I claim as new, and desire to secure by Letters Patent, is—

1. In combination with the handle, a cross-head $c$ at the end thereof, a tube beneath the cross-head and means for connecting the tube and cross-head, said means lying partly within and partly without the tube, substantially as described.

2. In combination, a handle, a cross-head, a tube under the cross-head, thumb-screws passing through the cross-head and down into the tube and nuts fitting against the upper inside of the tube and on the thumb-screws, substantially as described.

In witness whereof I have hereunto set my hand in presence of two witnesses.

GEORGE JOHN HOSKINS.

Witnesses:
 MANFIRED NEWTON,
 A. R. W. MASSEY.